United States Patent

Iwasaki et al.

[11] Patent Number: 5,858,276
[45] Date of Patent: Jan. 12, 1999

[54] DAP MODE LIQUID CRYSTAL DISPLAY DEVICE

[75] Inventors: Masayuki Iwasaki; Kimiaki Sato; Akira Sugimoto, all of Tsurugashima, Japan

[73] Assignee: Pioneer Electronic Corporation, Tokyo, Japan

[21] Appl. No.: 906,478

[22] Filed: Aug. 5, 1997

[30] Foreign Application Priority Data

Sep. 9, 1996 [JP] Japan ..................... 8-260290

[51] Int. Cl.$^6$ .......................... C09K 19/30; C09K 19/06; G02F 1/1337
[52] U.S. Cl. ................. 252/299.63; 252/299.6; 349/182; 349/113; 349/123
[58] Field of Search ............. 252/299.63, 299.6; 349/182, 123, 113

[56] References Cited

U.S. PATENT DOCUMENTS 5,399,292  3/1995  Buchecker et al. ............ 252/299.63
5,447,657  9/1995  Schadt et al. ................. 252/299.01

OTHER PUBLICATIONS

Chemical Abstract 120:335175 1993.

Chemical Abstract 115:194352 1991.

*Primary Examiner*—C. H. Kelly
*Attorney, Agent, or Firm*—Sughrue, Mion, Zinn, Macpeak & Seas, PLLC

[57] ABSTRACT

A liquid crystal composition for use in a DAP mode liquid crystal display device of a homeotropic structure type contains at least one kind of predetermined tolan derivative. The liquid crystal composition is used for a liquid crystal display device of an active-matrix drive type. The liquid crystal composition is also used for a projection type display. The content of the predetermined tolan derivative is in a range of 3 wt % to 20 wt %.

8 Claims, 11 Drawing Sheets

DAP MODE LIQUID CRYSTAL DISPLAY DEVICE

BACKGROUND OF THE INVENTION

1. Field of the Invention

The present invention relates to a liquid crystal compound containing a tolan derivative and a liquid crystal device (LCD) using the compound, and more particularly to a homeotropic structure type liquid crystal display device adopting a DAP mode.

2. Description of the Related Art

It is a general tendency that so far manufactured liquid crystal display devices adopt a TN mode or an STN mode which utilizes a nematic liquid crystal having a positive dielectric constant anisotropy. However, while these operation modes rely on twisted liquid crystal molecules, the twisted liquid crystal molecules appear to be different if the display device is viewed from different directions. As a result, the display device has a disadvantage that its contrast varies depending on a visual angle.

As a solution for eliminating the above disadvantage, a display device of a DAP mode utilizing a nematic liquid crystal with a negative dielectric constant anisotropy has been under consideration. In this mode, liquid crystal molecules are arranged substantially perpendicular to glass substrates in an initial arrangement of liquid crystal (when applied with a voltage equal to or less than a threshold value). Thus, the DAP mode has an advantage that the arrangement of liquid crystal molecules is the same regardless of visual angle and that the contrast has a low visual angle dependency. Under such background, studies on display devices of the DAP mode have been under progress.

To utilize a DAP mode liquid crystal for a display device, it is required that an abrupt threshold characteristic or abruptness $\gamma(V90/V10)$ is small, where V90 represents a voltage at which 90% of transmissivity is obtained, while V10 represents a voltage at which 10% of transmissivity is obtained.

Also, to realize a projection type liquid crystal display using this liquid crystal, a wide range of liquid crystal phase temperatures is required.

A transmitted light intensity I in the DAP mode is expressed by:

$$I = I_0 \sin^2 2\theta \sin^2(\pi R/\lambda)$$

where $I_0$ is an incident light intensity, $\theta$ is an angle formed by an incident polarized light direction and a vibration direction of ordinary light in a liquid crystal cell, and $\lambda$ is the wavelength of incident light. Further, R represents the amount of retardation of the liquid crystal cell, which depends on a cell thickness d, birefringence $\Delta n$ of a liquid crystal and an inclined angle $\phi(V)$ of the major axis of liquid crystal molecules, as expressed by:

$$R = d\Delta n \sin^2\phi(V)$$

It can be seen from the above equation that, to improve the abruptness $\gamma$, it is necessary to increase birefringence $\Delta n$ of liquid crystal as well as employ cells having a larger thickness d.

It is an object of the present invention to provide a liquid crystal material for use in the DAP mode, which has a wide liquid crystal phase temperature range even applicable to a projection type liquid crystal display, increased birefringence and improved abruptness $\gamma$.

SUMMARY OF THE INVENTION

A liquid crystal material in accordance with the present invention can be realized by mixing a tolan derivative having a high birefringence and a high n-1 point with a nematic liquid crystal material having a negative dielectric constant anisotropy, i.e., a liquid crystal material for the DAP type.

A liquid crystal composition according to the invention for use in a DAP mode liquid crystal display device of a homeotropic structure type, comprises a nematic liquid crystal material and at least one kind of tolan derivative represented by the following general formula:

where n represents an integer from 0 to 4.

In the liquid crystal composition, wherein said liquid crystal composition is used for a liquid crystal display device of active-matrix drive type.

In the liquid crystal composition, wherein said liquid crystal composition is used for a projection type display device.

In the liquid crystal composition, wherein the content of said tolan dielectric represented by the formula [1] is in a range of 3 wt % to 20 wt %.

In accordance with the present invention, a phase transition temperature of the nematic phase can be raised and the birefringence of a liquid crystal material can be increased by mixing a tolan derivative with a nematic liquid crystal material. As a result, it is possible to achieve improvements in characteristics of the liquid crystal material, including the temperature characteristic of the abruptness $\gamma$, and accordingly use the liquid crystal material for direct-view liquid crystal displays as well as projection-type liquid crystal displays.

DETAILED DESCRIPTION OF PREFERRED EMBODIMENTS

The present invention will hereinafter be described with reference to a tolan liquid crystal, taken as an example, having the structure represented by the following chemical formula [2]. This is the tolan derivative represented by formula [1] where integer "n" represents 2.

(First Embodiment)

Figure 2:
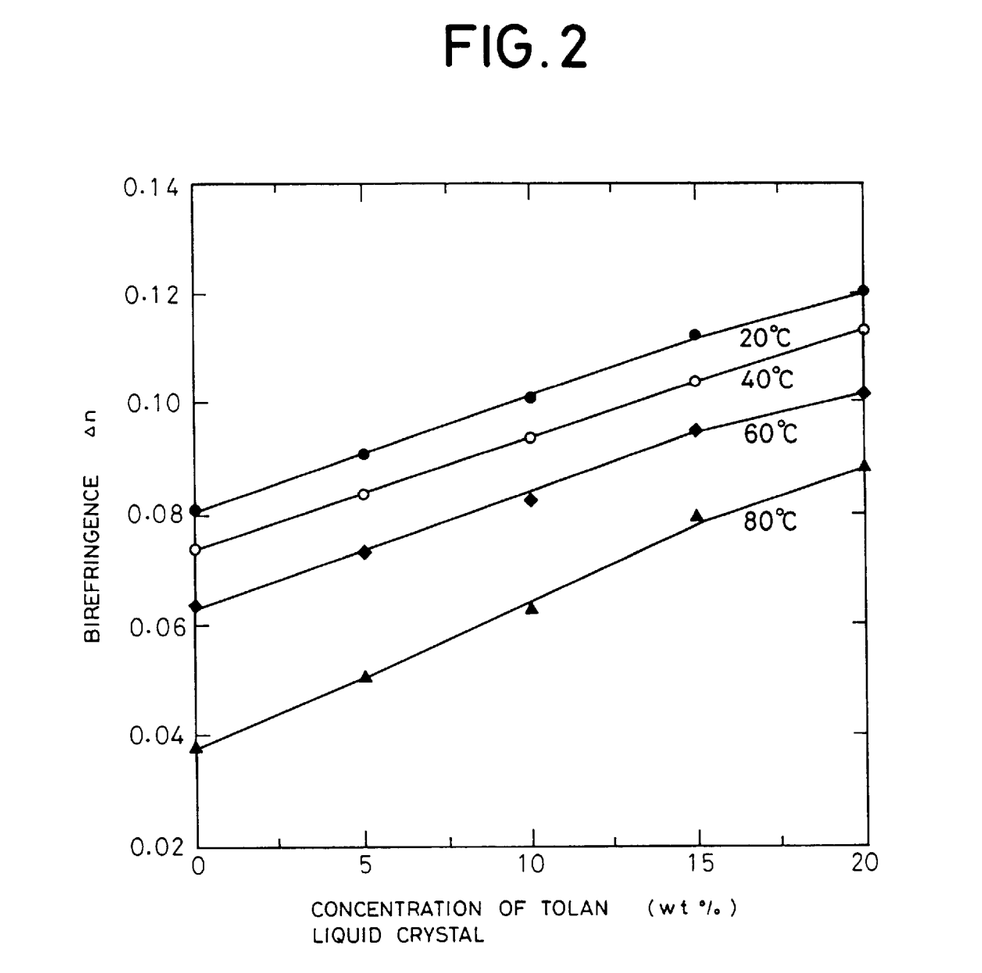
FIG. 2 is a graph illustrating changes in the birefringence observed when the tolan liquid crystal represented by a chemical formula [2] is mixed with a nematic liquid crystal A in accordance with the present invention.

FIG. 2 shows the curves of birefringence Δn of mixtures of a nematic liquid crystal A and the tolan liquid crystal represented by chemical formula [2] when the tolan liquid crystals are at 5 wt %, 10 wt % and 15 wt %. In FIG. 2, the abscissa represents the mixing ratio or the concentration of the tolan liquid crystal in the mixture by weight percent when the tolan liquid crystal represented by the chemical formula [2] is mixed with the nematic liquid crystal A, and the ordinate represents the birefringence Δn of the mixture.

Figure 3:
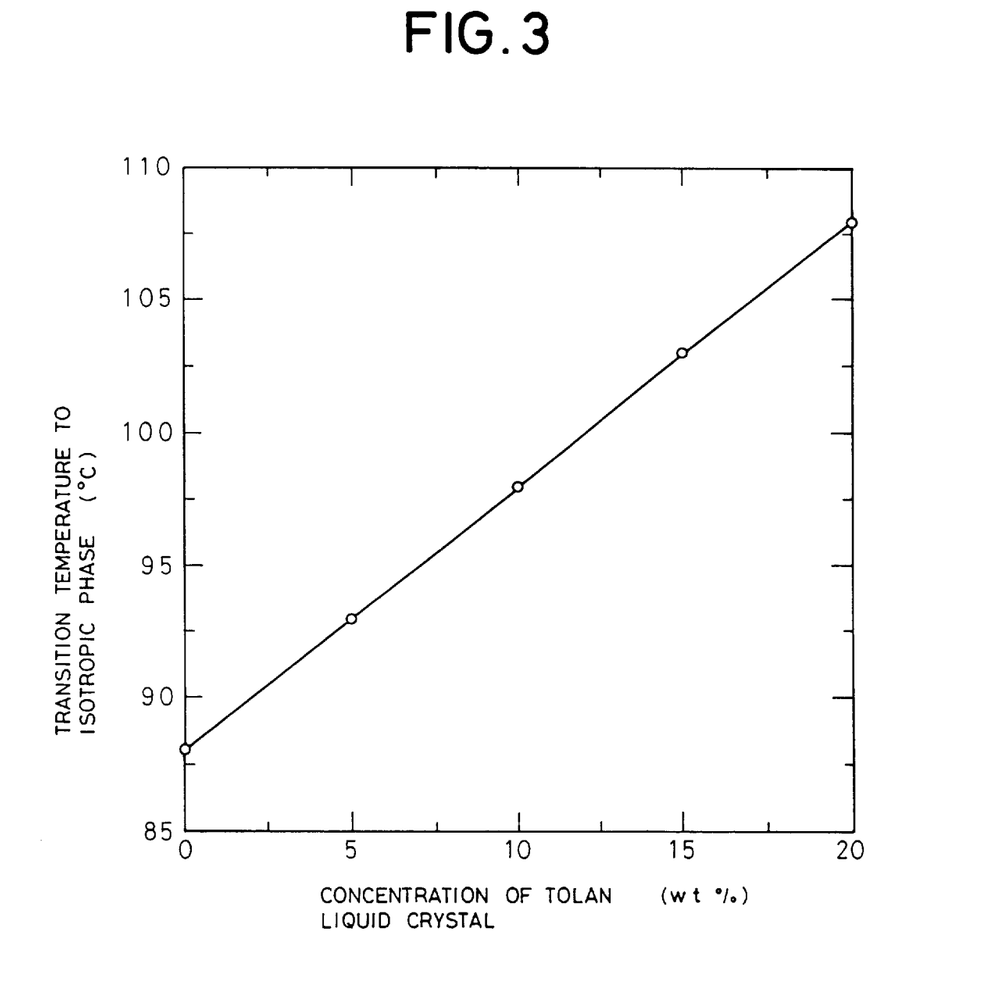
FIG. 3 is a graph illustrating a change in transition temperature to isotropic phase observed when the tolan liquid crystal represented by the chemical formula [2] is mixed with a nematic liquid crystal A in accordance with the present invention.

It can be seen from FIG. 2 that Δn can be increased by mixing a tolan group liquid crystal. FIG. 3 shows the results of measuring the transition temperature to the isotropic phase ($T_{NI}$). In FIG. 3, the abscissa represents the mixing ratio of the tolan liquid crystal in the mixture when the tolan liquid crystal represented by the chemical formula [2] is mixed with the nematic liquid crystal A, and the ordinate represents the transition temperature of the mixture to the isotropic phase. It can be seen from FIG. 3 that $T_{NI}$ can also be increased by mixing the tolan liquid crystal. Therefore, it is appreciated from the foregoing that the mixing of the tolan liquid crystal results in increased Δn and $T_{NI}$, thereby making it possible to improve the temperature characteristics of steepness. Then, the mixture of the liquid crystal is used to fabricate a liquid crystal panel as illustrated in FIG. 1 and the relationship between a voltage applied to the liquid crystal panel and brightness (V-T curve) is measured.

Figure 1:
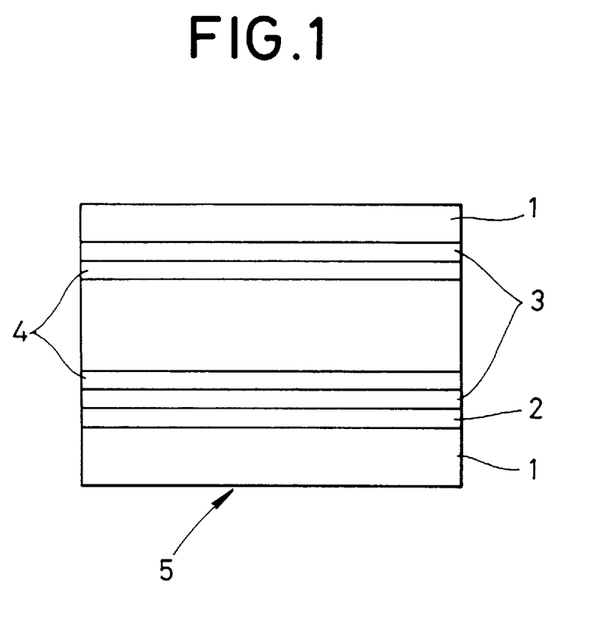
FIG. 1 shows a schematic diagram of a liquid crystal panel.

FIG. 1 illustrates a schematic diagram of the liquid crystal panel. The illustrated liquid crystal panel comprises glass substrates 1, a reflection film 2 made of Al, transparent electrodes 3, alignment layers 4, and a liquid crystal 5.

The liquid crystal panel has the alignment layers 4 positioned on both sides of the liquid crystal 5, and the transparent electrodes 3 are formed on the outer sides of the alignment layers 4. The panel also has the Al reflection film 2 positioned on one of the outer sides of the transparent electrodes 3 as a reflection film, and the glass substrates 1 on both outer sides of the transparent electrodes, thus forming a reflection type panel. The orientation of the liquid crystal 5 is achieved by a combination of oblique vacuum deposition of $SiO_2$ and perpendicular orientation processing agent. The panel has a thickness of approximately 3 micrometers and a pre-tilt angle of approximately 1 degree from the normal direction of the panel.

Figure 19:
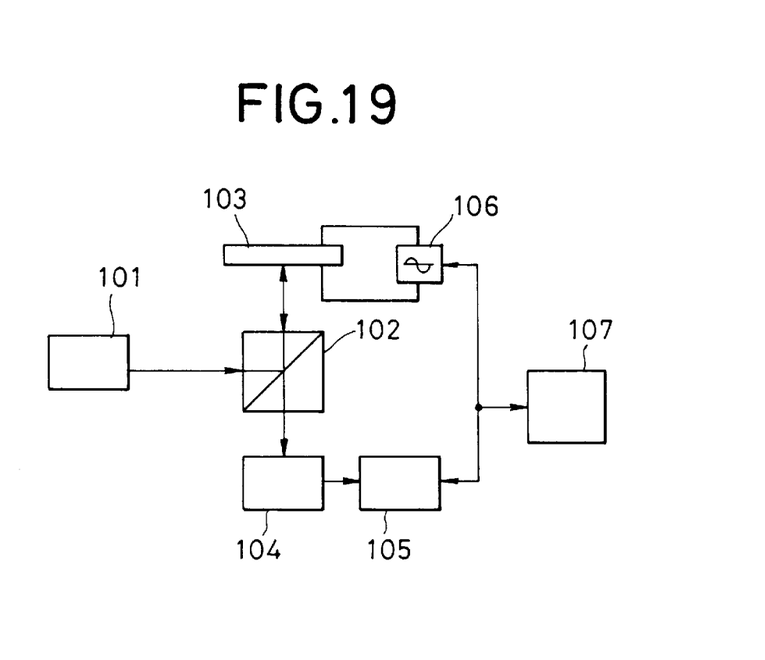
FIG. 19 is a diagram illustrating a measurement system for measuring the amount of reflected light of liquid crystals.

FIG. 19 illustrates a measuring system for measuring reflected light of the liquid crystal. The measuring system illustrated in FIG. 19 comprises a laser light source 101; a polarization beam splitter 102; a liquid crystal 103; a detector 104; an amplifier 105; a driving power supply 106; a measuring device 107. A laser beam emitted from the laser light source 101 is guided by the polarization beam splitter 103 toward the liquid crystal 103 under measurement, reflected by the liquid crystal 103, transmitted through the polarization beam splitter 102, and received by the detector 104. The detector 104 inputs an electrical output according to the amount of the received light to the amplifier 105, and an amplified electrical signal produced by the amplifier 105 is measured by the measuring device 107. In addition, the measuring device 107 controls the driving power supply 106 for applying a voltage to the liquid crystal 103. With measurements using the measuring system of FIG. 19, graphs representing the output levels versus voltages applied to liquid crystals are provided, as described later.

FIGS. 4 to 8 illustrate V-T curves plotted when the mixing ratio of the tolan liquid crystal to the nematic liquid crystals A are changed from 0 wt % to 5 wt %, 10 wt %, 15 wt % and 20 wt %, respectively.

Figure 4:
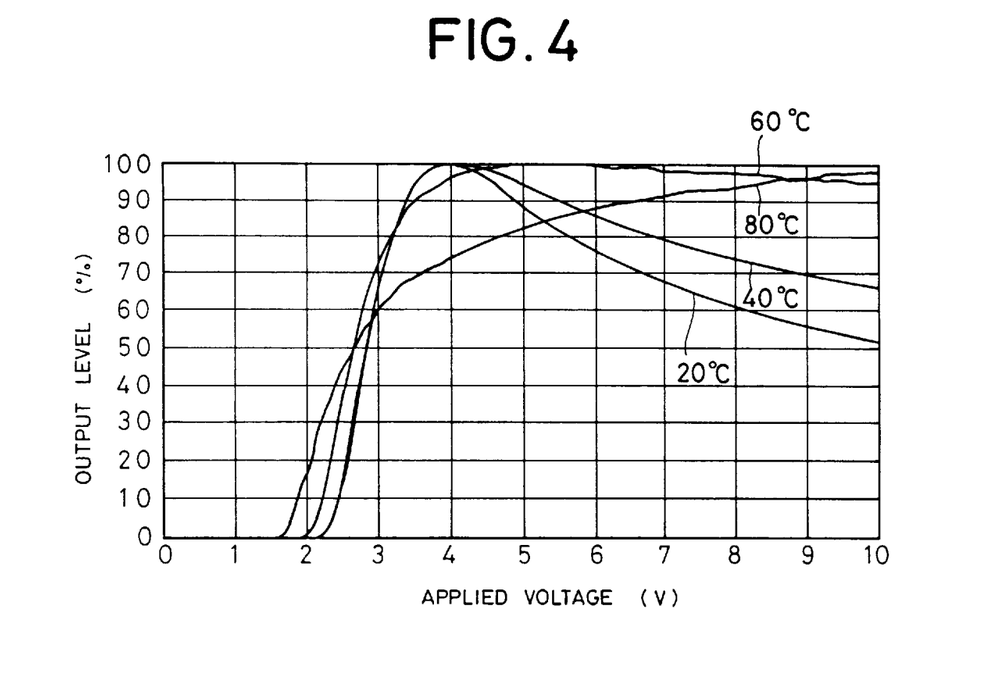
FIG. 4 is a graph illustrating electro-optical characteristics of a 100 wt % nematic liquid crystal A.

Specifically, FIG. 4 illustrates V-T curves plotted when the temperatures are at 20° C., 40° C., 60° C. and 80° C. with the mixture ratio of the tolan liquid crystal represented by the chemical formula [2] to the nematic liquid crystal A being fixed at 0%, where the abscissa represents a voltage applied to the liquid crystal panel, and the ordinate represents the output level.

Figure 5:
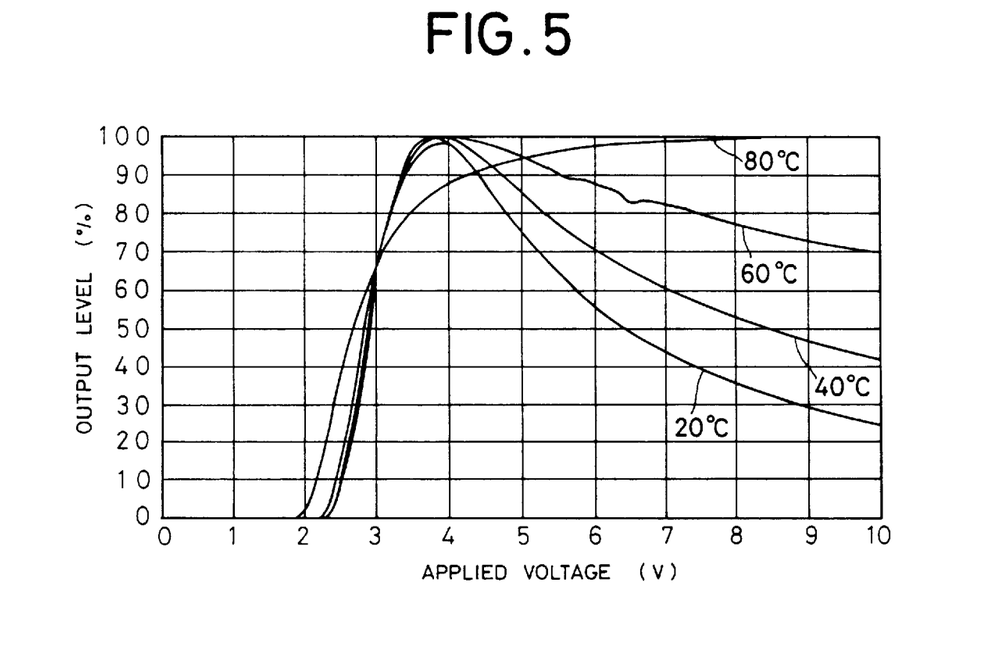
FIG. 5 is a graph illustrating electro-optical characteristics when a 5 wt % of the tolan liquid crystal represented by the chemical formula [2] is mixed with a nematic liquid crystal A in accordance with the present invention.

FIG. 5 illustrates V-T curves plotted when the temperatures are at 20° C., 40° C., 60° C. and 80° C. with the mixture ratio of the tolan liquid crystal represented by the chemical formula [2] to the nematic liquid crystal A being fixed at 5%, where the abscissa represents a voltage applied to the liquid crystal panel, and the ordinate represents the output level.

Figure 6:
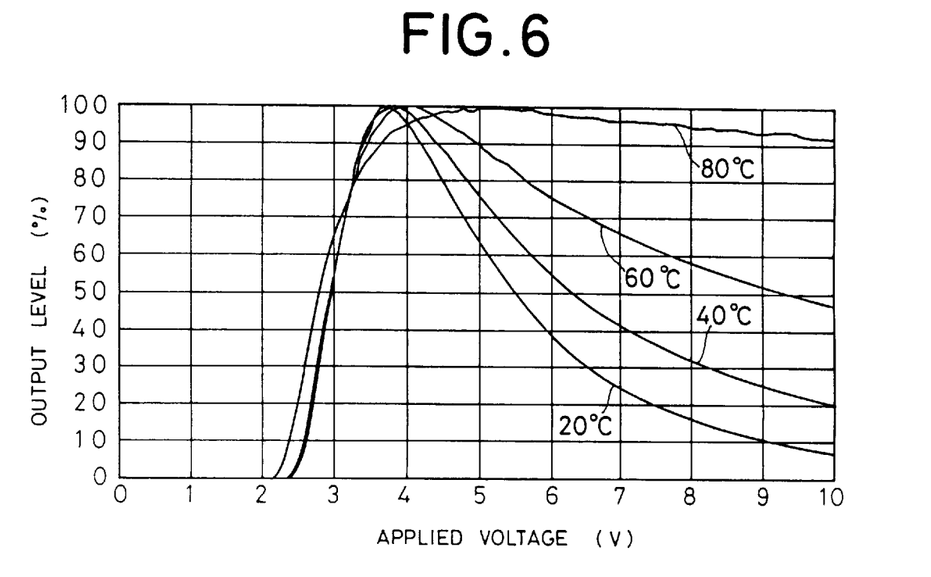
FIG. 6 is a graph illustrating electro-optical characteristics when a 10 wt % of the tolan liquid crystal represented by the chemical formula [2] is mixed with a nematic liquid crystal A in accordance with the present invention.

FIG. 6 illustrates V-T curves plotted when the temperatures are at 20° C., 40° C., 60° C. and 80° C. with the mixture ratio of the tolan liquid crystal represented by the chemical formula [2] to the nematic liquid crystal A being fixed at 10%, where the abscissa represents a voltage applied to the liquid crystal panel, and the ordinate represents the output level.

Figure 7:
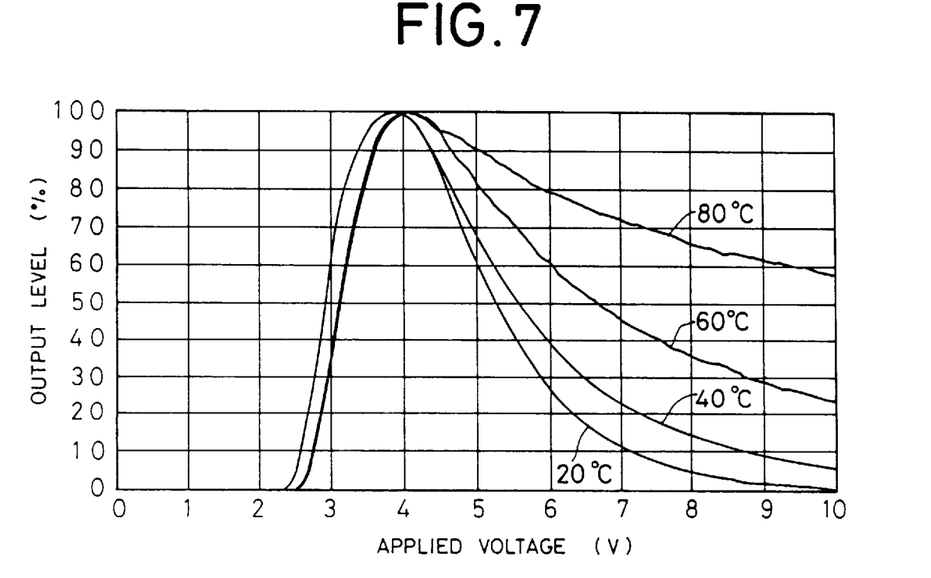
FIG. 7 is a graph illustrating electro-optical characteristics when a 15 wt % of the tolan liquid crystal represented by the chemical formula [2] is mixed with a nematic liquid crystal A in accordance with the present invention.

FIG. 7 illustrates V-T curves plotted when the temperatures are at 20° C., 40° C., 60° C. and 80° C. with the mixture ratio of the tolan liquid crystal represented by the chemical formula [2] to the nematic liquid crystal A being fixed at 15%, where the abscissa represents a voltage applied to the liquid crystal panel, and the ordinate represents the output level.

Figure 8:
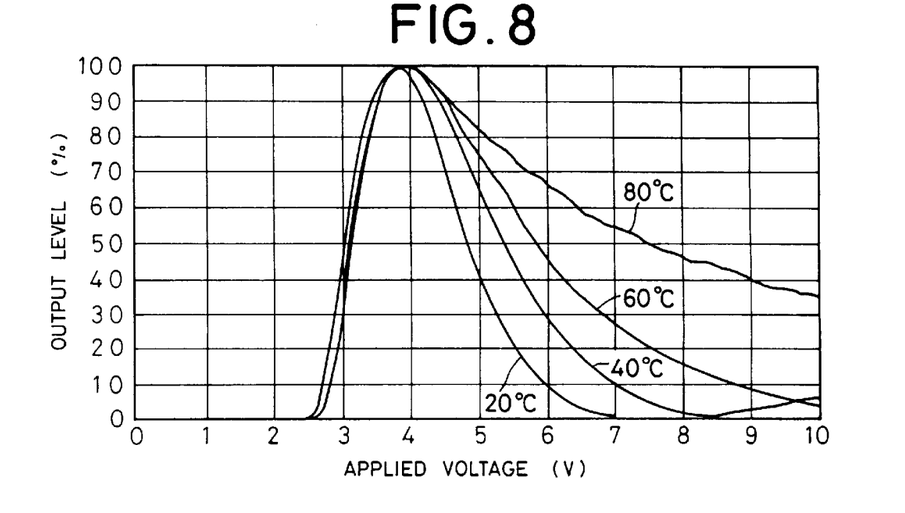
FIG. 8 is a graph illustrating electro-optical characteristics when a 20 wt % of the tolan liquid crystal represented by the chemical formula [2] is mixed with a nematic liquid crystal A in accordance with the present invention.

FIG. 8 illustrates V-T curves plotted when the temperatures are at 20° C., 40° C., 60° C. and 80° C. with the mixture ratio of the tolan liquid crystal represented by the chemical formula [2] to the nematic liquid crystal A being fixed at 20%, where the abscissa represents a voltage applied to the liquid crystal panel, and the ordinate represents the output level.

It can be seen in FIG. 4 (with 0 wt % of tolan liquid crystal), the abruptness γ becomes worse as the temperature of the liquid crystal panel rises. In contrast with this, it is appreciated from FIGS. 5 to 8 that the abruptness γ is improved and changes in temperature in the V-T curves can also be reduced as a larger amount of the tolan liquid crystal is mixed.

(Second Embodiment)

Figure 9:
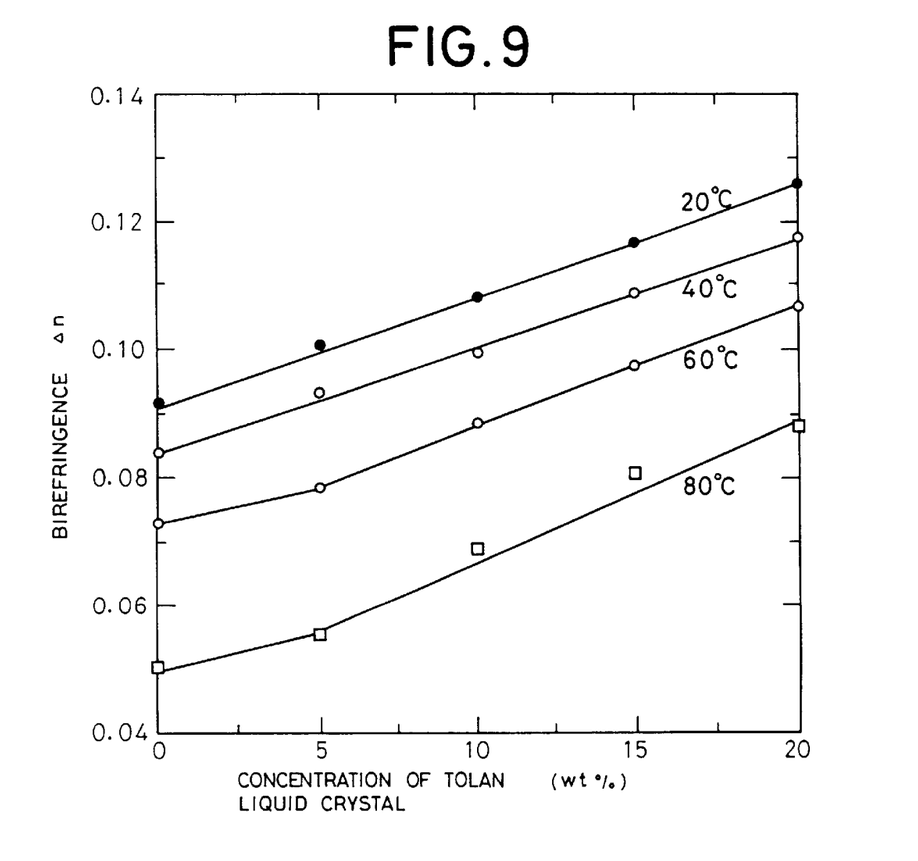
FIG. 9 is a graph illustrating changes in the birefringence observed when the tolan liquid crystal represented by the chemical formula [2] is mixed with a nematic liquid crystal B in accordance with the present invention.

The tolan liquid crystal is mixed with a nematic liquid crystal B, which is different from the nematic liquid crystal A, at 0 wt %, 5 wt %, 10 wt % and 15 wt %, and the birefringence Δn is measured for the respective concentrations. The results of the measurements are shown in FIG. 9. FIG. 9 represents the curves of birefringence of the mixture when the tolan liquid crystals represented by the chemical formula [2] of 0 wt %, 5 wt %, 10 wt % and 15% are mixed with the nematic liquid crystal B. In FIG. 9, the abscissa represents the mixing ratio of the tolan liquid crystal represented by the chemical formula [2] in the mixture, when mixed with the nematic liquid crystal B, and the ordinate represents the magnitude of the birefringence of the mixture. It is appreciated, similar to the first embodiment, that Δn can be increased by mixing the tolan liquid crystal. Also, a liquid crystal panel as illustrated in FIG. 1 is fabricated with the foregoing mixture, and the results of measuring V-T curves are illustrated in FIGS. 10 to 13.

Figure 10:
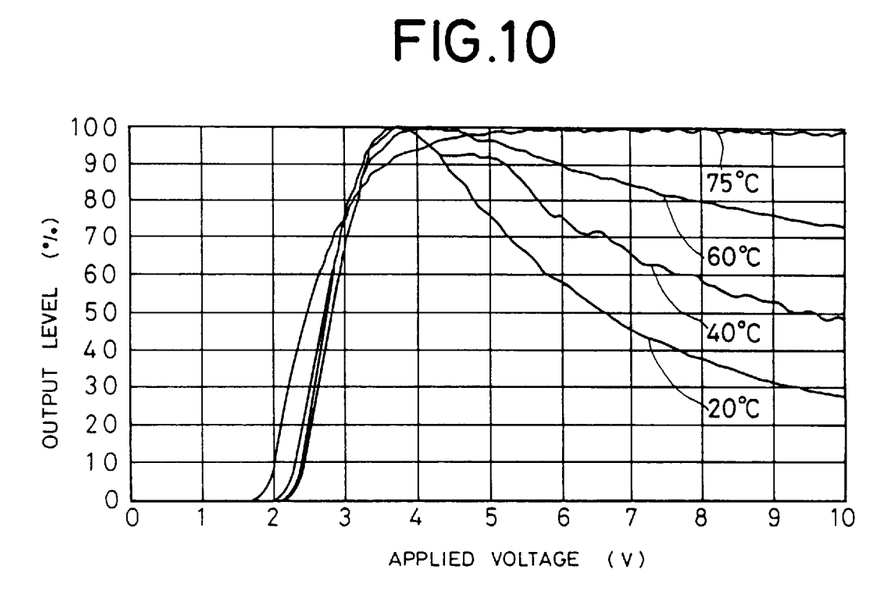
FIG. 10 is a graph illustrating electro-optical characteristics when a nematic liquid crystal B is at 100 wt %.

FIG. 10 illustrates V-T curves plotted when the temperatures are at 20° C., 40° C., 60° C. and 75° C. with the mixing ratio of the tolan liquid crystal represented by the chemical formula [2] to the nematic liquid crystal B being fixed at 0%, where the abscissa represents a voltage applied to the liquid crystal panel, and the ordinate represents the output level.

Figure 11:
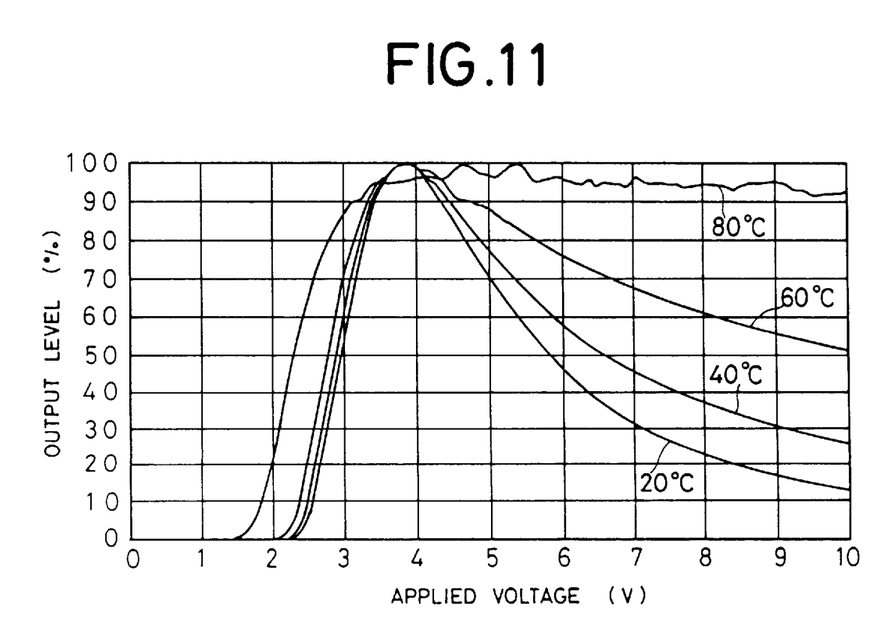
FIG. 11 is a graph illustrating electro-optical characteristics when a 5 wt % of the tolan liquid crystal represented by the chemical formula [2] is mixed with a nematic liquid crystal B in accordance with the present invention.

FIG. 11 illustrates V-T curves plotted when the temperatures are at 20° C., 40° C., 60° C. and 80° C. with the mixture ratio of the tolan liquid crystal represented by the chemical formula [2] to the nematic liquid crystal B being fixed at 5%, where the abscissa represents a voltage applied to the liquid crystal panel and the ordinate represents the output level.

Figure 12:
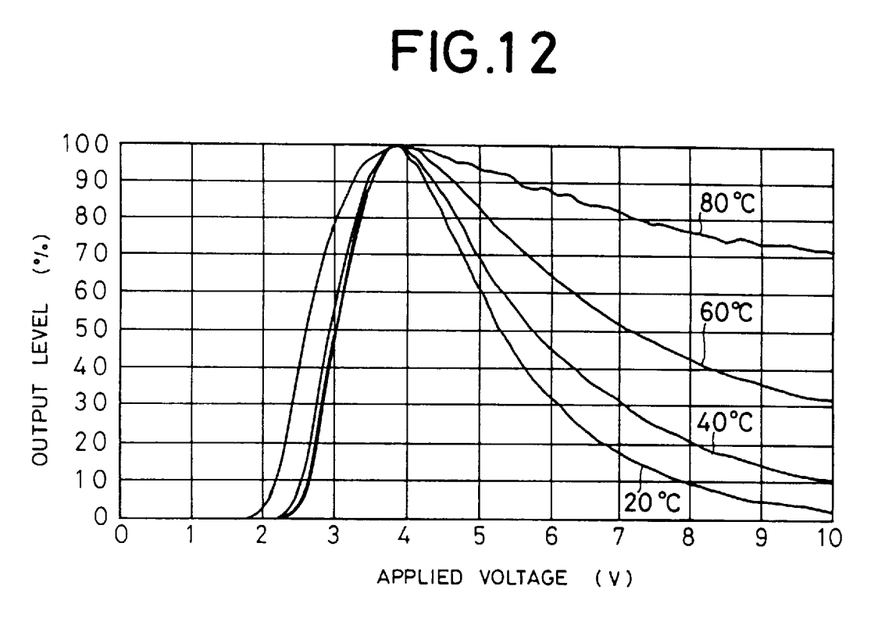
FIG. 12 is a graph illustrating electro-optical characteristics when a 10 wt % of the tolan liquid crystal represented by the chemical formula [2] is mixed with the nematic liquid crystal B in accordance with the present invention.

FIG. 12 illustrates V-T curves plotted when the temperatures are at 20° C., 40° C., 60° C. and 80° C. with the mixture ratio of the tolan liquid crystal represented by the chemical formula [2] to the nematic liquid crystal B being fixed at 10%, where the abscissa represents a voltage applied to the liquid crystal panel and the ordinate represents the output level.

Figure 13:
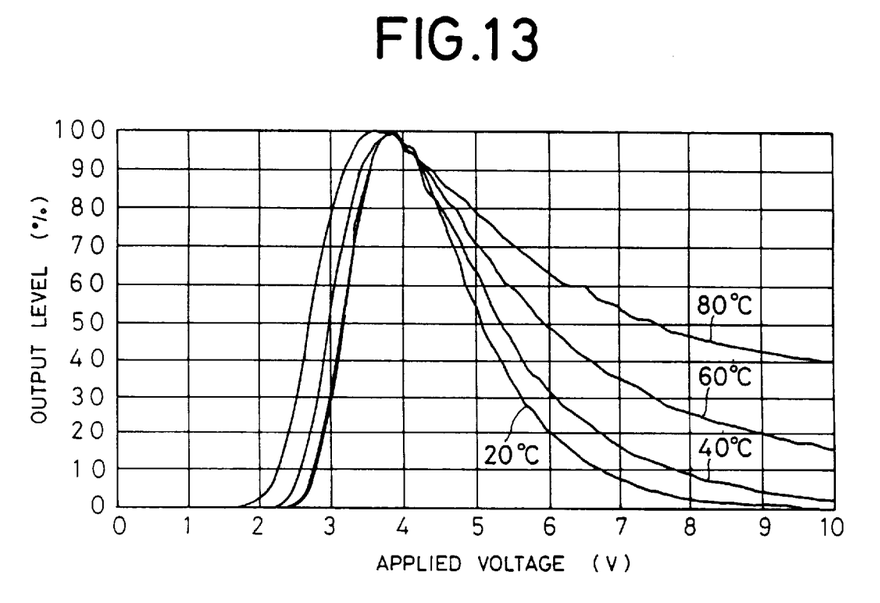
FIG. 13 is a graph illustrating electro-optical characteristics when a 15 wt % of the tolan liquid crystal represented by the chemical formula [2] is mixed to the nematic liquid crystal B in accordance with the present invention.

FIG. 13 illustrates V-T curves plotted when the temperatures are at 20° C., 40° C., 60° C. and 80° C. with the mixture ratio of the tolan liquid crystal represented by the chemical formula [2] to the nematic liquid crystal B being fixed at 15%, where the abscissa represents a voltage applied to the liquid crystal panel and the ordinate represents the output level.

As is apparent from FIGS. 10 to 13, changes in temperature in the V-T curves are reduced as the mixing ratio of the tolan liquid crystal represented by the chemical formula [2] is increased in FIGS. 11 to 13, as compared with the corresponding curves in FIG. 10 where the tolan liquid crystal is not mixed.

(Third Embodiment)

Similarly to the foregoing embodiments, the tolan liquid crystal is mixed with a nematic liquid crystal C which is different from the nematic liquid crystals A and B, a liquid crystal panel as illustrated in FIG. 1 is fabricated with the mixture, and V-T curves are measured.

Figure 14:
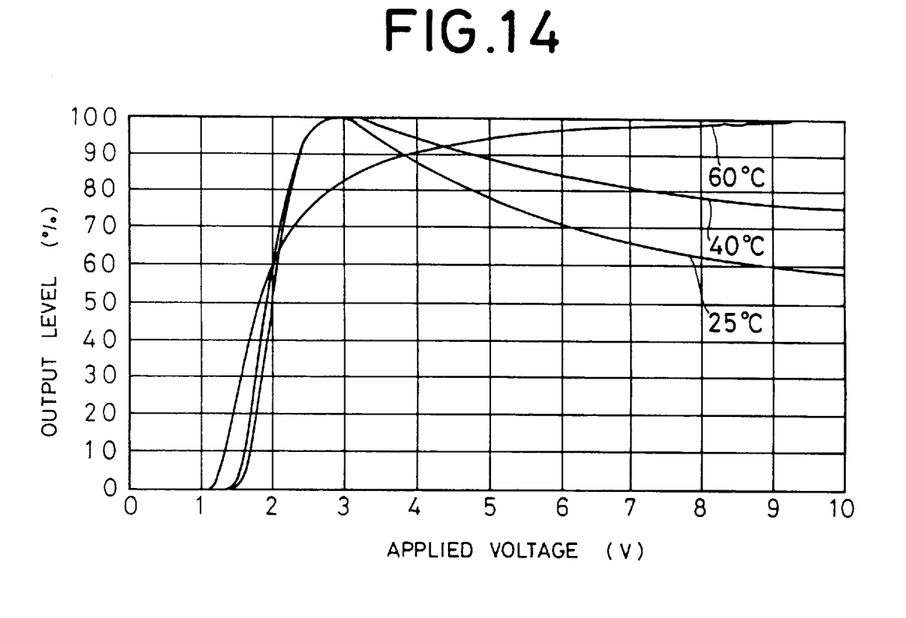
FIG. 14 is a graph illustrating electro-optical characteristics when a nematic liquid crystal C is at 100 wt %.

FIG. 14 illustrates V-T curves plotted when the temperatures are at 25° C., 40° C. and 60° C. when the mixing ratio of the tolan liquid crystal represented by the chemical formula [2] to the nematic liquid crystal C is 0%, where the abscissa represents a voltage applied to the liquid crystal panel, and the ordinate represents the output level.

Figure 15:
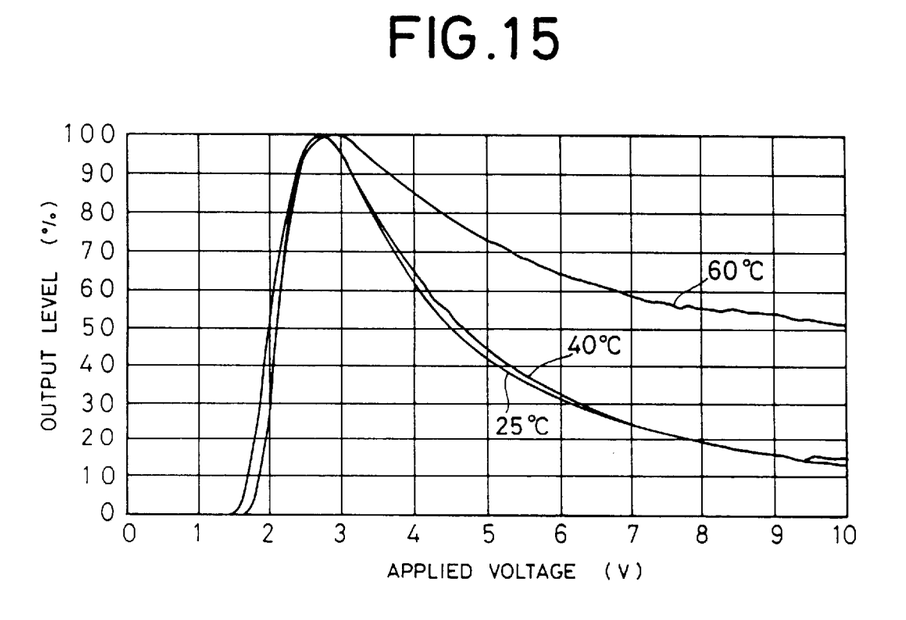
FIG. 15 is a graph illustrating electro-optical characteristics when a 10 wt % of the tolan liquid crystal represented by the chemical formula [2] is mixed with a nematic liquid crystal C in accordance with the present invention.

FIG. 15 illustrates V-T curves plotted when the temperatures are at 25° C., 40° C. and 60° C. with the mixture ratio of the tolan liquid crystal represented by the chemical formula [2] to the nematic liquid crystal C being fixed at 10%, where the abscissa represents the applied voltage to the liquid crystal panel, and the ordinate represents the output level.

Figure 16:
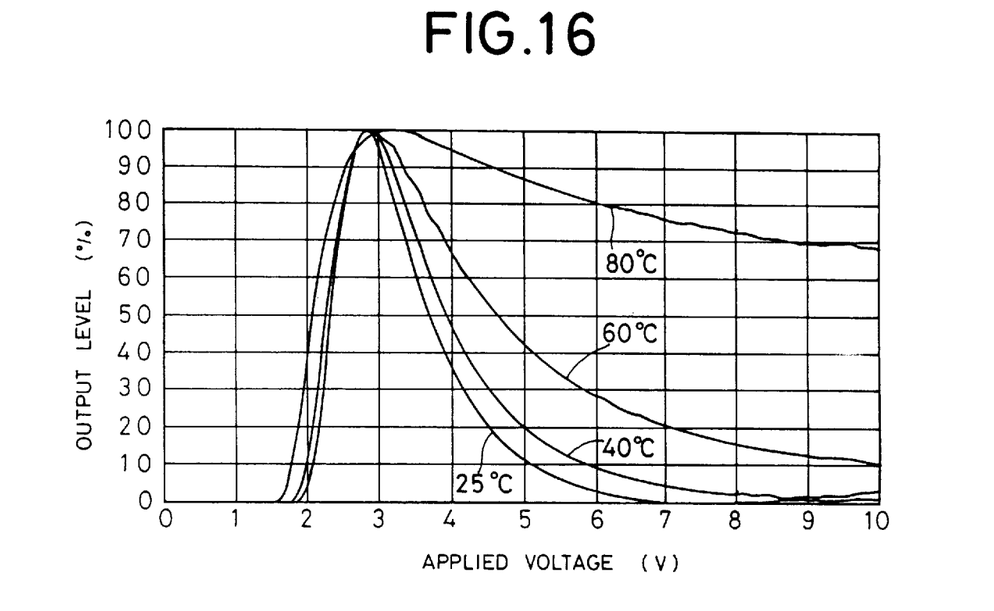
FIG. 16 is a graph illustrating electro-optical characteristics when a 20 wt % of the tolan liquid crystal represented by the chemical formula [2] is mixed with a nematic liquid crystal C in accordance with the present invention.

FIG. 16 illustrates V-T curves plotted when the temperatures are at 20° C., 40° C., 60° C. and 80° C. with the mixture ratio of the tolan liquid crystal represented by the chemical formula [2] to the nematic liquid crystal C being fixed at 20%, where the abscissa represents the applied voltage to the liquid crystal panel, and the ordinate represents the output level.

As is apparent from FIGS. 14 to 16, changes in temperature in the V-T curves are reduced as the mixing ratio of the tolan liquid crystal represented by the chemical formula [2] is increased from FIGS. 15 to 16, as compared with the corresponding curves in FIG. 14, where the tolan liquid crystal is not mixed.

Also, the results of measuring the transition temperatures to the isotropic phase show that a 100 wt % nematic liquid crystal C exhibits the transition to the isotropic phase at 62° C.; a mixture of 10 wt % tolan liquid crystal and 90 wt % nematic liquid crystal C at 75° C.; and a mixture of 20 wt % tolan liquid crystal and 80 wt % nematic liquid crystal at 85° C. It is therefore appreciated that the transition temperature to the isotropic phase can also be improved in a manner similar to the first embodiment.

(Fourth Embodiment)

Further, changes in temperature in the V-T curves can also be reduced when the tolan liquid crystal is mixed with another nematic liquid crystal D different from the nematic liquid crystals A to C.

Figure 17:
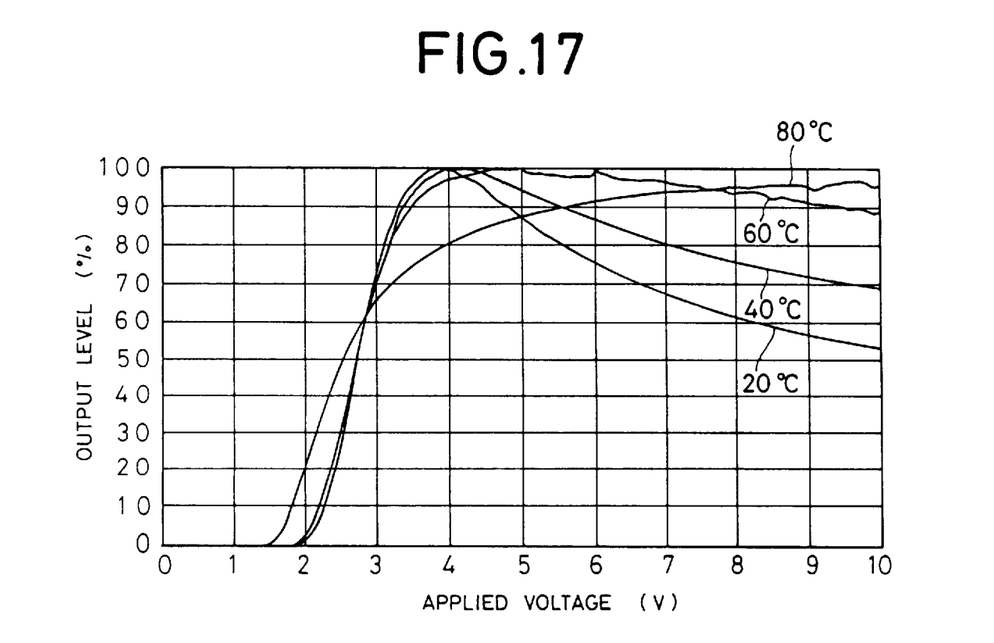
FIG. 17 is a graph illustrating electro-optical characteristics when a nematic liquid crystal D is at 100 wt %.

FIG. 17 illustrates V-T curves plotted when the temperatures are at 20° C., 40° C., 60° C. and 80° C. with the mixture ratio of the tolan liquid crystal represented by the chemical formula [2] to the nematic liquid crystal D being fixed at 0%, where the abscissa represents a voltage applied to the liquid crystal panel, and the ordinate represents the output level.

Figure 18:
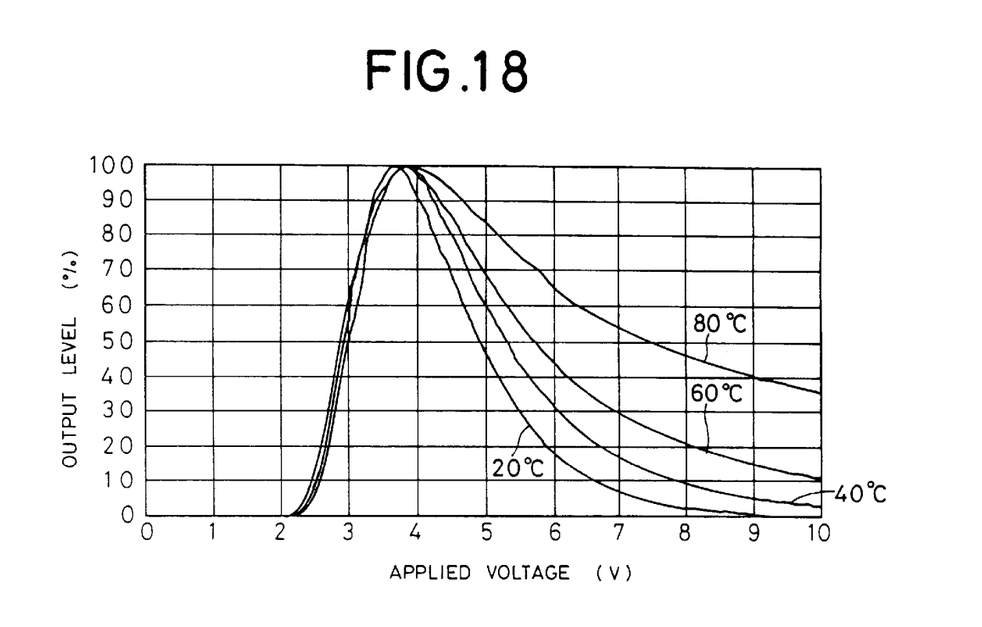
FIG. 18 is a graph illustrating electro-optical characteristics when a 15 wt % of the tolan liquid crystal represented by the chemical formula [2] is mixed with a nematic liquid crystal D in accordance with the present invention.

FIG. 18 illustrates V-T curves plotted when the temperatures are at 20° C., 40° C., 60° C. and 80° C. with the mixture ratio of the tolan liquid crystal represented by the chemical formula [2] to the nematic liquid crystal D being fixed at 15 wt %, where the abscissa represents a voltage applied to the liquid crystal panel, and the ordinate represents the output level.

As is apparent from FIGS. 17 and 18, changes in temperature in the V-T curves are reduced as the mixing ratio of the tolan liquid crystal represented by the chemical formula [2] is increased in FIG. 18, as compared with the corresponding curves in FIG. 17 where the tolan liquid crystal is not mixed.

While in the fourth embodiment, the tolan liquid crystal derivative represented by the chemical formula [2] is used for verification, similar effects to the above can also be obtained with a tolan liquid crystal represented by a chemical formula [1].

According to the present invention as described above, the mixing of the tolan liquid crystal, represented by the chemical formula [1], having high birefringence and high n-1 point with a nematic liquid crystal having positive dielectric constant anisotropy, provides larger birefringence, significantly improved abruptness γ, higher transition temperature to the isotropic phase, and reduced temperature-dependent changes in electro-optical characteristics.

What is claimed is:

1. A DAP mode liquid crystal display device of a homeotropic structure type, comprising a nematic liquid crystal composition with a negative dielectric constant anisotropy, wherein said nematic liquid crystal composition contains a tolan derivative represented by the following general formula:

where n represents an integer from 0 to 4.

2. A DAP mode liquid crystal display device according to claim 1, wherein said liquid crystal display device is of an active-matrix drive type.

3. A DAP mode liquid crystal display device according to claim 1, wherein said liquid crystal display device is a projection type display device.

4. A DAP mode liquid crystal display device according to claim 1, wherein the content of said tolan derivative is in a range of 3 wt % to 20 wt %.

5. A DAP mode liquid crystal display panel of a homeotropic structure type, comprising:

a pair of transparent substrates;

transparent electrodes formed on the substrates;

alignment films formed on the electrodes; and a liquid crystal composition sandwiched between the alignment films, wherein the liquid crystal composition has a negative dielectric constant anisotropy, wherein said liquid crystal composition consists of a nematic liquid crystal and a tolan derivative represented by the following general formula:

where n represents an integer from 0 to 4.

6. A DAP mode liquid crystal display panel of a homeotropic structure type according to claim 5, further comprising a reflection film positioned on one of the outer sides of the transparent electrodes.

7. A DAP mode liquid crystal display panel of a homeotropic structure type according to claim 5, wherein the alignment films are formed so that a homeotropic orientation of the liquid crystal is achieved by a combination of oblique vacuum deposition and a perpendicular orientation processing agent.

8. A DAP mode liquid crystal display panel of a homeotropic structure type according to claim 5, wherein the content of the tolan derivative is in a range of 3 wt % to 20 wt %.

* * * * *